(12) United States Patent
Panicker et al.

(10) Patent No.: US 12,155,768 B2
(45) Date of Patent: Nov. 26, 2024

(54) ZERO TRUST BASED ACCESS MANAGEMENT OF INFRASTRUCTURE WITHIN ENTERPRISE USING MICRO-SEGMENTATION AND DECENTRALIZED IDENTIFIER NETWORK

(71) Applicant: Wipro Limited, Bangalore (IN)

(72) Inventors: Vinod Ramachandra Panicker, Kochi (IN); Sumod Rajan George, Kakkanad (IN)

(73) Assignee: Wipro Limited, Bangalore (IN)

( * ) Notice: Subject to any disclaimer, the term of this patent is extended or adjusted under 35 U.S.C. 154(b) by 356 days.

(21) Appl. No.: 17/650,333

(22) Filed: Feb. 8, 2022

(65) Prior Publication Data
US 2023/0198764 A1 Jun. 22, 2023

(30) Foreign Application Priority Data
Dec. 16, 2021 (IN) .............................. 202141058737

(51) Int. Cl.
*G06F 21/00* (2013.01)
*H04L 9/32* (2006.01)
*H04L 9/00* (2022.01)

(52) U.S. Cl.
CPC .......... *H04L 9/3221* (2013.01); *H04L 9/3271* (2013.01); *H04L 9/50* (2022.05)

(58) Field of Classification Search
CPC ..... H04L 9/3221; H04L 9/3271; H04L 41/12; H04L 9/50; H04L 63/0428; H04L 63/08; H04L 9/0894; H04L 9/3218
See application file for complete search history.

(56) References Cited

U.S. PATENT DOCUMENTS 7,743,145 B2 * 6/2010 Kaler .................... G06F 21/445
                                                            726/8
10,114,970 B2 10/2018 Goldfarb et al.
(Continued)

FOREIGN PATENT DOCUMENTS

CN 113225333 A * 8/2021

OTHER PUBLICATIONS

"The Four Barriers to Micro-Segmentation", wmware, White Paper, Mar. 2020, 10 pages.

*Primary Examiner* — Michael M Lee
(74) *Attorney, Agent, or Firm* — Finnegan, Henderson, Farabow, Garrett & Dunner, LLP.

(57) ABSTRACT

A system and method for onboarding and managing assets in a decentralized identity network is disclosed. The method may include receiving an authorization proof from a member of a team of an enterprise to access an asset in the decentralized identity network. The method may further include validating the member of the team through a set of validator nodes. The method may further include provisioning the asset on the decentralized identity network. The method may further include onboarding the provisioned asset on the decentralized identity network. The method may further include generating a set of derived credentials of the onboarded asset. The method may further include validating a user access request corresponding to at least one of owners of an application and user to access the asset. The method may further include dynamically validating an employee access request from an employee and the unique asset DID to access the asset.

20 Claims, 7 Drawing Sheets

(56) References Cited

U.S. PATENT DOCUMENTS

| | | | |
|---|---|---|---|
| 2017/0078168 A1* | 3/2017 | Harris, Jr. | H04L 41/40 |
| 2019/0036906 A1* | 1/2019 | Biyani | H04L 63/102 |
| 2019/0394242 A1* | 12/2019 | Wig | H04L 9/3093 |
| 2020/0186538 A1* | 6/2020 | Koshal | H04L 61/2557 |
| 2021/0409217 A1* | 12/2021 | Maley | H04L 63/123 |
| 2022/0166665 A1* | 5/2022 | O'Neil | H04L 41/0803 |

* cited by examiner

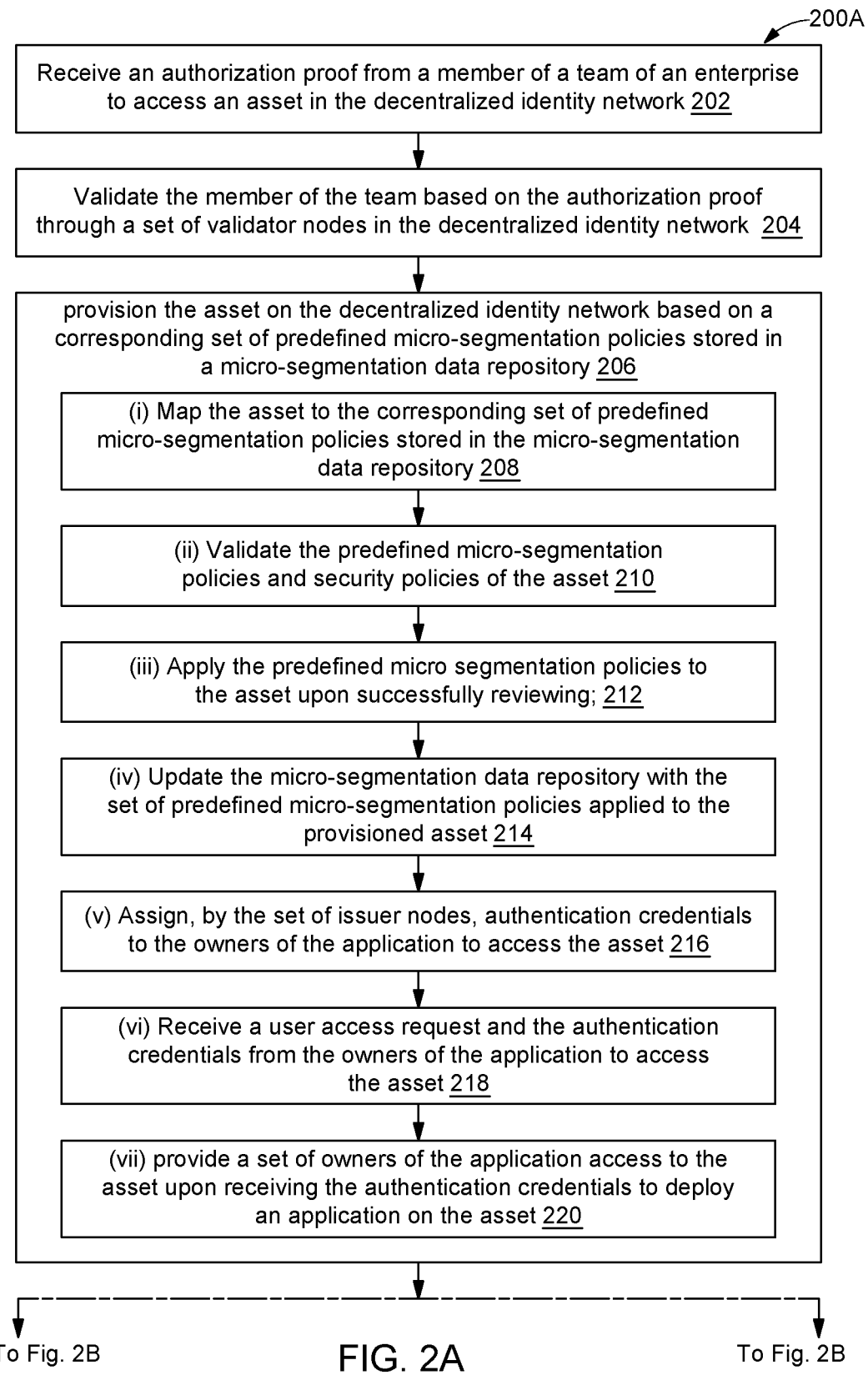

ZERO TRUST BASED ACCESS MANAGEMENT OF INFRASTRUCTURE WITHIN ENTERPRISE USING MICRO-SEGMENTATION AND DECENTRALIZED IDENTIFIER NETWORK

TECHNICAL FIELD

This disclosure relates generally to network security, and more particularly to access management of infrastructure in an enterprise.

BACKGROUND

Generally, all organizations have data centers that incorporate services and other infrastructure equipment to manage their operations. With an increase in cloud adoption, an organization may have a data center (DC) on the cloud or have a hybrid model where the data center is spread on a premise and on the cloud. Firewalls, Intrusion Prevention Systems (IPS), and other security systems are designed in such a way to inspect and secure traffic coming into the data centers in a north-south direction. This may not be adequate to prevent threats that may arise from the traffic coming in the east-west direction. This gap has been exploited by hackers to gain access to the assets behind the firewall and obtain private information about the organization. Access to these infrastructure assets is empowered through role definitions and leveraged credentials such as user id and password.

Conventionally, the credentials are stored in a central data repository, which is frequently used by hackers to breach security of organizations. Incorporating latest security measures into such a centralized system necessitates additional effort and ongoing emphasis on the part of the enterprises. Any lapse from the organization end may cost the organization a lot of money. Hackers often attempt to obtain user credentials through phishing and malware attempts. Once the hackers have the credentials, it is much easier for them to gain access to the asset within the organization, than using that asset, they would hop onto other assets to gain private information and compromise the security of the organization.

To address this issue, traditionally organizations pursue segmentation of their infrastructure network or focus on challenges involved in implementing micro-segmentation in the organization network as well as the mechanisms to address these challenges. In the zero-trust network, organizations focus on implementing risk-based access control. The approach of segmentation involves internal firewalls, Access Control List (ACL), and Virtual Local Area Network (VLAN) configuration on networking equipment. The Internet Protocol (IP) address is the primary mechanism to apply traditional segmentation. The network engineers need to reconfigure the IPs to enable connectivity for the new servers in DC. However, these approaches fall short of addressing how to protect assets from unwanted access, how to keep track of who has tried to access assets on the network. And are costly and difficult to scale efficiently when the organization is pursuing digital transformation. On the other hand, risk-based access control primarily entails the user and the asset employing fuzzy logic to define appropriate actions for each identified risk. Any omission in the definition of risk controls could permit unauthorized access, jeopardizing all defined security rules and impacting the organization's overall security posture.

In the present state of the art, better methods and procedures are available to achieve segmentation, with micro-segmentation being the focus. Micro-segmentation allows the security team to enforce security policies on a micro level, it also necessitates additional manual effort to analyze the access logs on each server to identify unauthorized access attempts. The logs can also be modified to remove audit trails for certain access attempts. The modification of logs makes the micro-segmentation method harder to identify all unauthorized access attempts to the assets within an organization.

There is therefore a need in the present state of the art for an efficient mechanism/method for authenticating and authorizing a set of users to access the asset without sharing credential information between the users and the asset. Also, capturing all access attempts and communications between the assets in the network in an immutable manner thus making it available for security forensic activities.

SUMMARY OF THE INVENTION

In one embodiment, a method for onboarding and managing assets in a decentralized identity network is disclosed. The method may include receiving an authorization proof from a member of a team of an enterprise to access an asset in the decentralized identity network. The authorization proof of the member provides a preauthorized access to the asset. The access to the asset is recorded in a distributed ledger. The method may further include validating the member of the team based on the authorization proof through a set of validator nodes in the decentralized identity network by the asset management system. The method may further include, upon successfully validating, provisioning, the asset on the decentralized identity network based on a corresponding set of predefined micro-segmentation policies may be stored in a micro-segmentation data repository. The method may further include onboarding the provisioned asset on the decentralized identity network by assigning a unique asset Decentralized Identifier (DID) to the asset through a set of issuer nodes. The method may further include generating a set of derived credentials of the onboarded asset based on the corresponding set of predefined micro-segmentation policies and the unique asset DID in the decentralized identity network. The method may further include validating a user access request corresponding to at least one of the owners of an application and a user to access the asset. The user access request includes the set of derived credentials. The owners of the application are configured to deploy the application on the asset. The method further includes dynamically validating an employee access request from an employee and the unique asset DID both using a zero-knowledge proof-based challenge mechanism through the set of validator nodes. The employee access request includes a unique employee DID. Employee access request is stored in the distributed ledger.

In one embodiment, a system for onboarding and managing assets in a decentralized identity network is disclosed. In one example, the system may include a processor and a computer-readable medium communicatively coupled to the processor. The computer-readable medium may store processor-executable instructions, which, on execution, may cause the processor to receive an authorization proof from a member of a team of an enterprise to access an asset in the decentralized identity network. The authorization proof of the member provides a preauthorized access to the asset. The access to the asset is recorded in a distributed ledger. The processor-executable instructions, on execution, may further cause the processor to validate the member of the team based on the authorization proof through a set of validator nodes in the decentralized identity network. Upon successfully validating, the processor-executable instructions, on execution, may further cause the processor to provision the asset on the decentralized identity network based on a corresponding set of predefined micro-segmentation policies stored in a micro-segmentation data repository. The processor-executable instructions, on execution, may further cause the processor to onboard the provisioned asset on the decentralized identity network by assigning a unique asset Decentralized Identifier (DID) to the asset through a set of issuer nodes. The processor-executable instructions, on execution, may further cause the processor to generate a set of derived credentials of the onboarded asset based on the corresponding set of predefined micro-segmentation policies and the unique asset DID in the decentralized identity network. The processor-executable instructions, on execution, may further cause the processor to validate a user access request corresponding to at least one of owners of an application and a user to access the asset using a zero knowledge proof-based challenge mechanism through the set of validator nodes. The user access request includes the set of derived credentials. The owners of the application are configured to deploy the application on the asset. The processor-executable instructions, on execution, may further cause the processor to dynamically validate an employee access request from an employee and the unique asset DID using the zero knowledge proof-based challenge mechanism through the set of validator nodes. The employee access request includes a unique employee DID. Employee access request is stored in the distributed ledger.

In one embodiment, a non-transitory computer-readable medium storing computer-executable instructions for onboarding and managing assets in a decentralized identity network is disclosed. The stored instructions, when executed by a processor, cause the processor to perform operations including receiving an authorization proof from a member of a team of an enterprise to access an asset in the decentralized identity network. The authorization proof of the member provides a preauthorized access to the asset. The access to the asset is recorded in a distributed ledger. The operations may further include validating the member of the team based on the authorization proof through a set of validator nodes in the decentralized identity network by the asset management system. Upon successfully validating, the operations may further include provisioning the asset on the decentralized identity network based on a corresponding set of predefined micro-segmentation policies may be stored in a micro-segmentation data repository. The operations may further include onboarding the provisioned asset on the decentralized identity network by assigning a unique asset Decentralized Identifier (DID) to the asset through a set of issuer nodes. The operations may further include generating a set of derived credentials of the onboarded asset based on the corresponding set of predefined micro-segmentation policies and the unique asset DID in the decentralized identity network. The operations may further include validating a user access request corresponding to at least one of the owners of an application and a user to access the asset. The user access request includes the set of derived credentials. The owners of the application are configured to deploy the application on the asset. The operations may further include dynamically validating an employee access request from an employee and the unique asset DID both using a zero-knowledge proof-based challenge mechanism through the set of validator nodes. The employee access request comprises a unique employee DID. Employee access request is stored in the distributed ledger.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A-2C illustrate a flow diagram of an exemplary method for onboarding and managing assets in a decentralized identity network, in accordance with an embodiment of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed.

Figure 1:
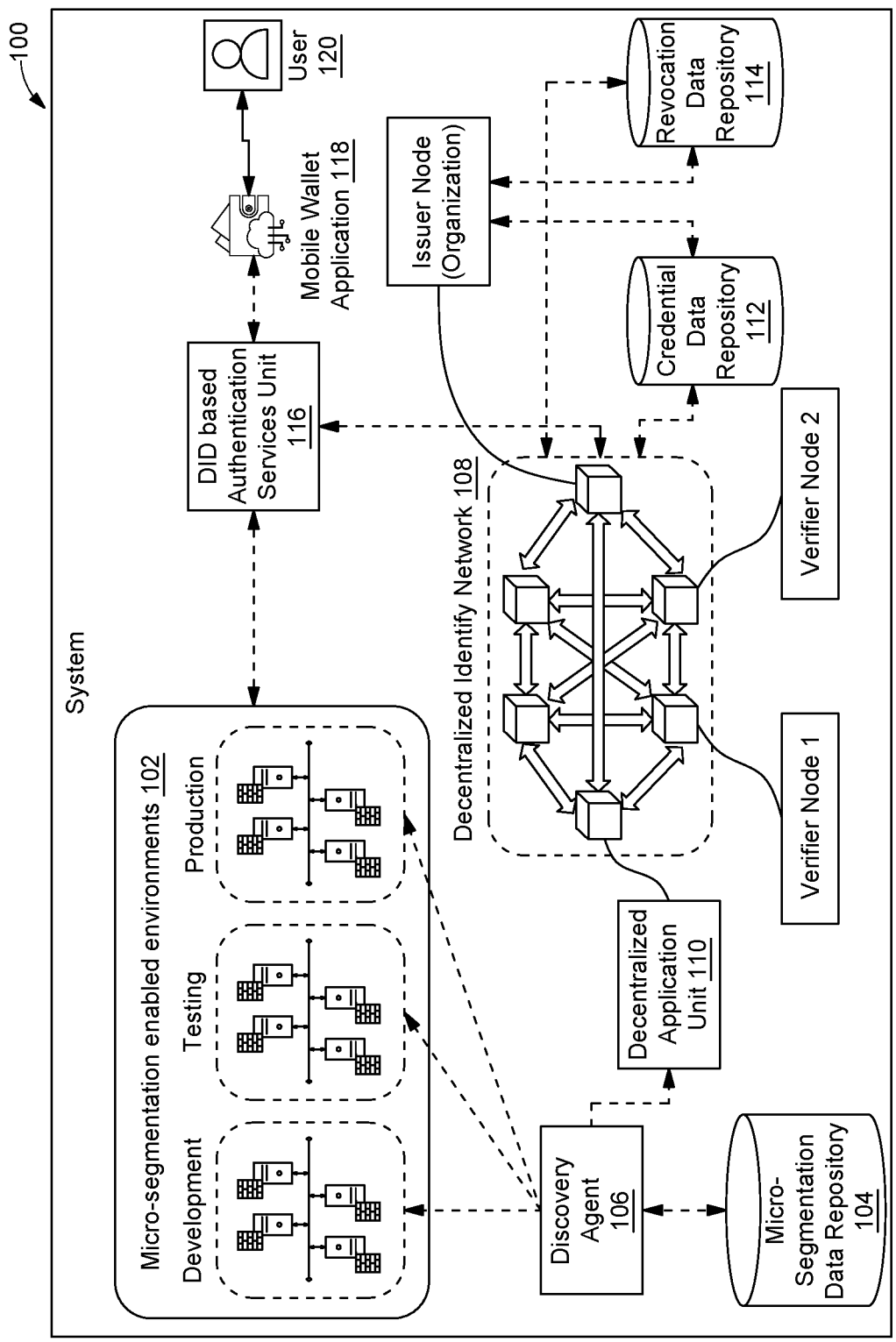
FIG. 1 illustrates an exemplary asset management system for enabling zero trust-based access management of infrastructure within an enterprise using micro-segmentation and decentralized identifier network, in accordance with an embodiment of the present disclosure.

Referring now to FIG. 1, an exemplary asset management system 100 for enabling zero trust-based access management of infrastructure within an enterprise using micro-segmentation and decentralized identifier network is illustrated, in accordance with the present disclosure. The asset management system 100 may enable zero trust-based access management of infrastructure within an enterprise. In particular, the system may include micro-segmentation enabled environments 102, a micro-segmentation data repository 104, a discovery agent 106, a decentralized identity network 108 including an issuer node, a set of verifier nodes (for example, verifier node-1, verifier node-2), a decentralized application unit 110, a credential data repository 112, a revocation data repository 114, DID based authentication services unit 116, a mobile wallet application 118, and a user 120. Herein the terms "decentralized application" and "decentralized application unit" are used interchangeably without limiting the scope of the invention.

The micro-segmentation-enabled environment 102 may include different asset environments in the enterprise on which the micro-segmentation is enabled. In an embodiment, the micro-segmentation may be enabled using conventional micro-segmentation mechanisms. The asset environment in the enterprise may be grouped into the development environment, testing environment, and production environment based on the particular purpose. The grouping may be essential to prevent interactions between the assets in each environment and limit potential security issues from occurring. The micro-segmentation policy definition available on the asset in the development environment may be shared with the discovery agent 106. Further, the micro-segmentation policy definition available on the asset in the testing environment may be shared with the discovery agent 106. Further, the micro-segmentation policy definition available on the asset in the production environment may be shared with the discovery agent 106.

In an embodiment, the micro-segmentation data repository 104 may store the details corresponding to all micro-segmentation policy definitions. When the asset may be on-boarded onto the network, the network and security team may define the micro-segmentation policy for the asset. The defined policy may be stored in the micro-segmentation data repository 104. Further, any updates to the micro-segmentation security policy may be reflected in the data repository 104. Further, the micro-segmentation data repository 104 may be in communication with the discovery agent 106, for sharing the micro-segmentation policy definitions. This information may be shared with the discovery agent 106 to verify the micro-segmentation policy definitions available on the assets against the available policies in the micro-segmentation data repository 104.

The discovery agent 106 may extract the micro-segmentation policy definition available on the asset in the development network for verification purposes. Further, the discovery agent 106 may extract the micro-segmentation policy definition available on the asset in the testing network for verification purposes. Further, the discovery agent 106 may extract the micro-segmentation policy definition available on the asset in the production network for verification purposes. Further, the discovery agent 106 may extract the micro-segmentation policy definitions from the micro-segmentation data repository 104. The discovery agent 106 may be responsible for verifying the security policy definition on each asset against the micro-segmentation data repository 104. Further, the discovery agent 106 may send the details on the micro-segmentation policies defined on the assets in development, testing, and production networks (environments) to the decentralized application unit 110. The micro-segmentation security policy for each asset may be shared with decentralized application unit 110 to generate derived credentials. The derived credentials may be stored in the credential data repository 112. Further, any non-compliance in terms of security policy definitions may be logged onto a distributed ledger using the decentralized application unit 110. This can be viewed by the authorized individuals from the security and network teams to take appropriate action to resolve reported non-compliance incidents. Further, the discovery agent 106 may share the information on any discrepancies related to the micro-segmentation policy definitions with the decentralized application unit 110.

The decentralized application unit 110 may be configured to receive the details on the micro-segmentation policies defined on the assets in the development, testing, and production networks from the discovery agent 106. Further, the decentralized application unit 110 may be configured to receive information on any discrepancies with the micro-segmentation policy definitions. In an embodiment, the decentralized application unit 110 may run on a Peer-to-Peer (P2P) network or distributed ledger technology-based network. These are not controlled in a central manner and may be designed to implement specific business needs that need to run on a distributed ledger technology-based network such as managing the infrastructure in the organization in a decentralized manner or managing the flow of items between various departments in the factory, and similar things. The decentralized application unit 110 is configured to send the asset identity information, micro-segmentation policy confirmations, and discrepancies to the decentralized identity network.

The decentralized application unit 110 may further be configured to manage the credentials for the infrastructure assets in the organization. The decentralized application unit 110 may be hosted on the distributed network. The primary inputs to this application unit 110 may include the decentralized Identifier (DID) of the servers that are active on the network, various operational environments in the organization, mapping of the servers to the respective domains or environments, the applications hosted on these servers, and the access control lists to these servers. This input information may be utilized by the decentralized application unit 110 to define the schema for the servers. Further, the decentralized application unit 110 may be configured to receive information on the mapping of the micro-segmentation policies to the servers and applications that it hosts. This information may form the input to define the micro-segmentation schema for the organization. Each micro-segmentation policy may have its schema definition, and this may be issued by the discovery agents 106 to generate the derived credentials and share the same with the decentralized identity network 108.

The decentralized application unit 110 may be configured to generate scheme definition for the servers on the network environment, Further, the decentralized application unit 110 may be configured to generate the micro-segmentation schema definition for each micro-segmentation policy that may be available for the network environment. Further, the decentralized application unit 110 may be configured to issue the credentials for the application i.e., mapping the server/application to the defined micro-segmentation policy leveraging the server schema definition and micro-segmentation schema definition. Further, the decentralized application unit 110 may be configured to trigger off-chain report generation using data from the distributed ledger. Further, the decentralized application unit 110 may be configured to revoke credentials for the application when the owners decide to retire the application. It should be noted that the decentralized application unit 110 may revoke the credentials through a workflow-based feature. The application owners may initiate a workflow for revoking the credentials.

As will be described in greater detail in conjunction with FIG. 1, the server schema and micro-segmentation schema so generated may be available on the distributed ledger in terms of DID reference to the credentials that are stored in the credential data repository 112. Each information element of the asset/organization, an employee may have a DID associated with it and this DID may be referenced in the credentials or proofs within the organization. The schema may enable to map DID to the information element. The schema generation may be based on the use case under consideration for the organization. For example, in the case of managing the organization's infrastructure, the server schema definition will help to relate the DIDs to the type of asset, its physical attributes (such as RAM, storage capacity, ports, communication protocols), its operating system, network environment in which the asset will be deployed, access control lists, asset ownership, the type of applications to be hosted on the asset, issuer details of a credential issued to the asset and the validity of the issued credentials.

Similarly, the micro-segmentation schema definition may help to relate the DIDs to the micro-segmentation policies implemented on the asset and expiry details of these policies. In an embodiment, the application has a workflow-based process that may extract the inputs (attributes, identity relation information, configuration details, applications to be hosted on the specific asset, OS installed on the server, etc.) for these schemas from the respective server owners and application owners. The security auditors may use the off-chain application that compares the micro-segmentation policy definition at the organizational level with the micro-segmentation schema definition to identify the missing or irrelevant policy. The schema may be different for various environments that will be hosted by the organization. This variation in the schema may help to ensure that the assets are not enabled connection across environments against the defined policies without requiring manual intervention. Further, as part of onboarding, the assets onto the decentralized identity network 108, the definition of server schemas and micro-segmentation schemas may happen for each type of network environment that the organization hosts. While onboarding new assets to the specific network environment, the schema definition may also be performed. When the organization decides to modify the micro-segmentation policy, the decentralized application may initiate the schema definition generation mechanism.

The decentralized identity network 108 may include a set of issuer nodes and a set of verifier nodes. As an exemplary illustration, one issuer node and two verifier nodes (verifier node 1 and the verifier node 2) are depicted without limiting the scope of the invention. The decentralized identity network 108 may receive the asset identity information, micro-segmentation policy confirmations, and discrepancies from the decentralized application unit 110. Further, the decentralized identity network 108 may manage the identity of all assets and employees in the enterprise. The focus of the present invention may include the asset identity management aspect and how to leverage it to enable and manage the micro-segmentation of infrastructure in the enterprise. The network may host a decentralized application that will offer a variety of capabilities for enabling zero trust-based management of assets in the organization. Further, the decentralized identity network 108 may receive the details of credentials stored in the credential data repository 112 for verification by the verifier nodes. Further, the decentralized identity network 108 may receive the details of revoked credentials stored in the revocation data repository 114 for verification by the verifier nodes. Further, the decentralized identity network unit 108 may receive the details on authentication attempts from the DID based authentication services unit 116.

In an embodiment, the issuer node may be responsible for issuing credentials for the assets on the development environment, testing environment, and production environment. Additionally, the issuer node may be responsible for issuing credentials to the users for indicating that the users are authorized to access or perform specific activities on the assets. Further, the issuer node may share the details of credentials issued with the credential data repository 112 for storage purposes. Further, the issuer node may share the details of credentials revoked with the revocation data repository 114 for storage purposes.

In an embodiment, the verifier node 1 and the verifier node 2 may be collectively referred to as verifier node(s) without limiting the scope of the invention. The verifier nodes may validate the details to be recorded in the distributed ledger. Upon successful validation, the details may be written to the distributed ledger. The verifier node 1 and the verifier node 2 may be included as an integral part of any decentralized identity network.

In an embodiment, the decentralized identifiers (DID) may be a World Wide Web Consortium (W3C) specification for unique identifiers. It may be a new type of identifier that enables verifiable, decentralized digital identity. The holder of the DID may be able to prove control over it without requiring permission from any other party. In order to set up DID based network within an organization, the organization may set each department as a verifiable organization, and so that they can relate to each other through a network of verifiable organizations. Each department may have the ability to issue DID-based proofs, hold the DID-based proofs issued to the department by the organization, and verify the DID-based proofs issued by other departments in the organization to the employees. Each department may host a node on the network and will have a local copy of the distributed ledger.

The credential data repository 112 may include the credentials issued to the assets and employees of the organization. Further, the credential data repository 112 may also include the derived credentials using the micro-segmentation security policy definitions for each asset. The DID references to these credentials may be logged onto the distributed ledger. Further, a challenge mechanism may leverage this credential information to establish the eligibility of the individual to access the specific asset. The credential data repository 112 may send the details of credentials for verification by the verifier nodes. Further, the credential data repository 112 may receive the details of credentials issued from the issuer node.

The revocation data repository 114 may include details of the credentials that have been revoked for various defined and approved cases. This may help to avoid misuse of the credential to secure unauthorized access to the asset by any employee. The revocation of the credential may be performed by the decentralized identity network 108 based on the pre-defined conditions. In an embodiment, the pre-defined conditions may include, but are not limited to, change in the application stack deployed on the server, change in ownership for the application stack deployed on the server, change in OS of the server, change in port configurations for the asset, the server has been decommissioned, the application deployed on the server has been retired or migrated to a different server, new interfaces have been defined for the server to server communication within the network, etc. The approach may help to avoid misuse of the revocation capability by any single entity. The revocation data repository 114 may receive the details of credentials revoked by the issuer node for storage purposes from the issuer node. Further, the revocation data repository 114 may send details of revoked credentials for verification to the verifier node in the decentralized identity network 108.

The DID-based authentication services unit 116 may be in communication with the assets in the development/testing/production network for enabling user authentication to the respective asset. The DID-based authentication services unit 116 may be configured to leverage a series of Zero-Knowledge Proof challenge mechanisms to establish the eligibility of an individual to access a specific asset. During the challenge mechanism, both the individual (who is attempting to access the asset) and the asset may need to present credential proofs to prove their identity and the authorization for the individual to access the asset. This may be a mutual presentation of proofs rather than a one-way presentation of proofs (traditional approach where the individual shares his login id and password for authentication to the asset). Further, the DID-based authentication services unit 116 may be configured to send the details on authentication attempts to the decentralized identity network 108. Further, the DID-based authentication services unit 116 may be in communication with the mobile wallet application 118 to enable authentication for the user 120 on the specific asset in the development/testing/production network.

The mobile wallet application 118 may be in communication with the DID-based authentication services unit 116 to enable authentication for the user 120 on the specific asset in the development/testing/production network. In an embodiment, the individuals or employees of the organization may manage their identity-related credentials using the wallet application 118 on their mobile device. This wallet application 118 may help the individual to store and share the credentials with their relationship in a secure manner. During the sharing of credentials or proofs, the owner of the credentials may encrypt the credential or proof using his/her private key and the recipient may be able to decrypt the credential or proof using the owner's public key. This may ensure that no one else will be able to gain control over these credentials without the consent of the owner of the credentials. In an embodiment, the user may be any of the following employees of the enterprise such as network administrators, security engineers, application owners, application users, DB administrators, server administrators, and so on.

In some embodiments, one or more entities of the asset management system 100 (such as, one or more of the set of issuer nodes and the set of verifier nodes of the decentralized identity network 108) may include one or more processors (not shown in figure) and a computer-readable medium (for example, a memory).

Figure 2B:
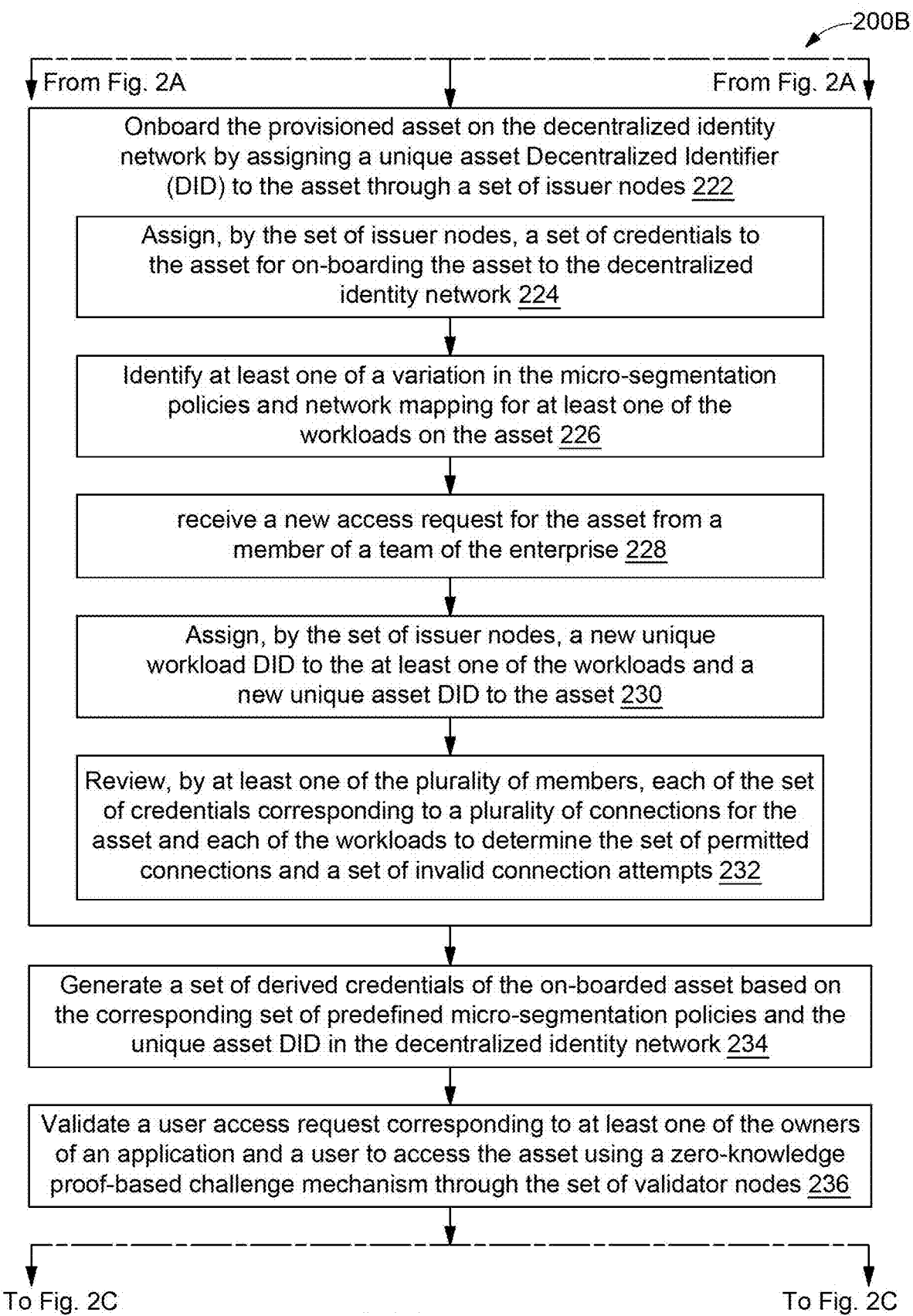
Figure 2C:
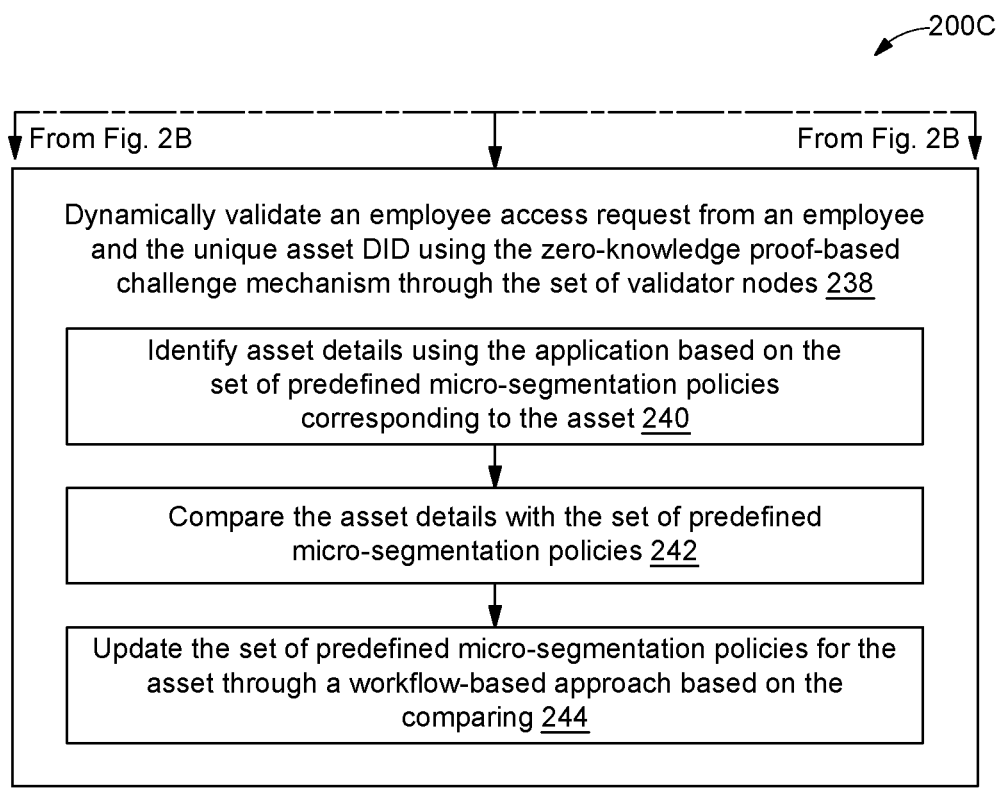

Referring now to FIGS. 2A-C, an exemplary method 200 (A, B, and C) for onboarding and managing assets in a decentralized identity network is depicted via flowchart, in accordance with some embodiments of the present disclosure. In an embodiment, the method 200 may be implemented by the asset management system 100. The method 200 for onboarding and managing assets in a decentralized identity network may include receiving an authorization proof from a member of a team of an enterprise to access an asset in the decentralized identity network 108, at step 202. The authorization proof of the member may provide a preauthorized access to the asset. The access to the asset may be recorded in a distributed ledger. The network team may need to authenticate using DID-based authentication services unit 116 to provision a new asset onto the organization network. The DID-based authentication service unit 116 may be hosted on the organization's decentralized identity network 108 to manage the identity of employees and assets. In order to establish their identity, the network team may be required to present cryptographically encrypted proofs to the DID-based authentication services unit 116. The authorization proof of the member may provide preauthorized access to the asset and the access to the asset is recorded in a distributed ledger.

Further, the method 200A includes validating the member of the team based on the authorization proof through a set of validator nodes in the decentralized identity network 108 by the asset management system, at step 204. Further, the method 200A includes provisioning the asset on the decentralized identity network 108 after successful validation, based on a corresponding set of predefined micro-segmentation policies stored in a micro-segmentation data repository 104, at step 206.

Further, the step 206 of the method 200A may include mapping the asset to the corresponding set of predefined micro-segmentation policies stored in the micro-segmentation data repository 104, at step 208. Further, the step 206 of the method 200A may include validating the predefined micro-segmentation policies and security policies of the asset by the team and the owners of the application, at step 210. Further, the step 206 of the method 200A may include applying the predefined micro-segmentation policies to the asset upon successfully reviewing by at least one of the plurality of members, at step 212. Further, the step 206 of the method 200A may include updating the micro-segmentation data repository 104 with the set of predefined micro-segmentation policies applied to the provisioned asset, by the at least one of the plurality of members, at step 214.

Further, the step 206 of the method 200A may include assigning authentication credentials to the owners of the application to access the asset by the set of issuer nodes, at step 216. Further, the step 206 of the method 200A may include receiving a user access request and the authentication credentials from the owners of the application to access the asset, at step 218. Further, the step 206 of the method 200A may include providing a set of owners of the application access to the asset upon receiving the authentication credentials to deploy an application on the asset, at step 220. The details corresponding to the user access request may be stored in the distributed ledger.

Further, the method 200B includes onboarding the provisioned asset on the decentralized identity network 108 by assigning a unique asset Decentralized Identifier (DID) to the asset through a set of issuer nodes by the asset management system, at step 222. Further, the step 222 of the method 200B may include assigning a set of credentials to the asset for onboarding the asset to the decentralized identity network 108 by the set of issuer nodes, at step 224. The set of credentials may include the unique asset DID, a unique workload DID for each of workloads hosted on the asset, a set of permitted connections for the asset and each of the workloads, a pairwise DID for each of the set of permitted connections, and users authorized to access the asset and one or more of the workloads.

Further, the step 222 of the method 200B may include identifying at least one variation in the micro-segmentation policies and network mapping for at least one of the workloads on the asset, at step 226. Further, the step 222 of the method 200B may include receiving a new access request for the asset from a member of a team of the enterprise, at step 228. Further, the step 222 of the method 200B may include assigning a new unique workload DID to the at least one of the workloads and a new unique asset DID to the asset by the set of issuer nodes, at step 230. Each of the new unique workload DID and the new unique asset DID is stored in the distributed ledger. Further, the step 222 of the method 200B may include reviewing each of the set of credentials corresponding to a plurality of connections for the asset and each of the workloads to determine the set of permitted connections and a set of invalid connection attempts by at least one of the plurality of members, at step 232. Each of the set of permitted connections and a set of invalid connection attempts is stored in the distributed ledger.

Further, the step 234 of the method 200B includes generating a set of derived credentials of the onboarded asset based on the corresponding set of predefined micro-segmentation policies and the unique asset DID in the decentralized identity network by the asset management system. Further, the step 236 of the method 200B includes validating a user access request corresponding to at least one of the owners of an application and a user to access the asset using a zero-knowledge proof-based challenge mechanism through the set of validator nodes. Further, the step 238 of the method 200C includes dynamically validating an employee access request from an employee and the unique asset DID using the zero-knowledge proof-based challenge mechanism through the set of validator nodes. Further, the step 238 of the method 200C includes identifying asset details using the application based on the set of predefined micro-segmentation policies corresponding to the asset, at step 240. Further, the step 238 of the method 200C includes comparing the asset details with the set of predefined micro-segmentation policies, at step 242. Further, the step 238 of the method 200C includes updating the set of predefined micro-segmentation policies for the asset through a workflow-based approach based on the comparing, at step 244.

It may be noted that each of a set of credentials assigned to the asset may be revoked by the set of issuer nodes. The set of credentials may include the set of derived credentials. It may also be noted that an off-chain report may be generated through the application based on data corresponding to the asset stored in the distributed ledger.

Figure 3:
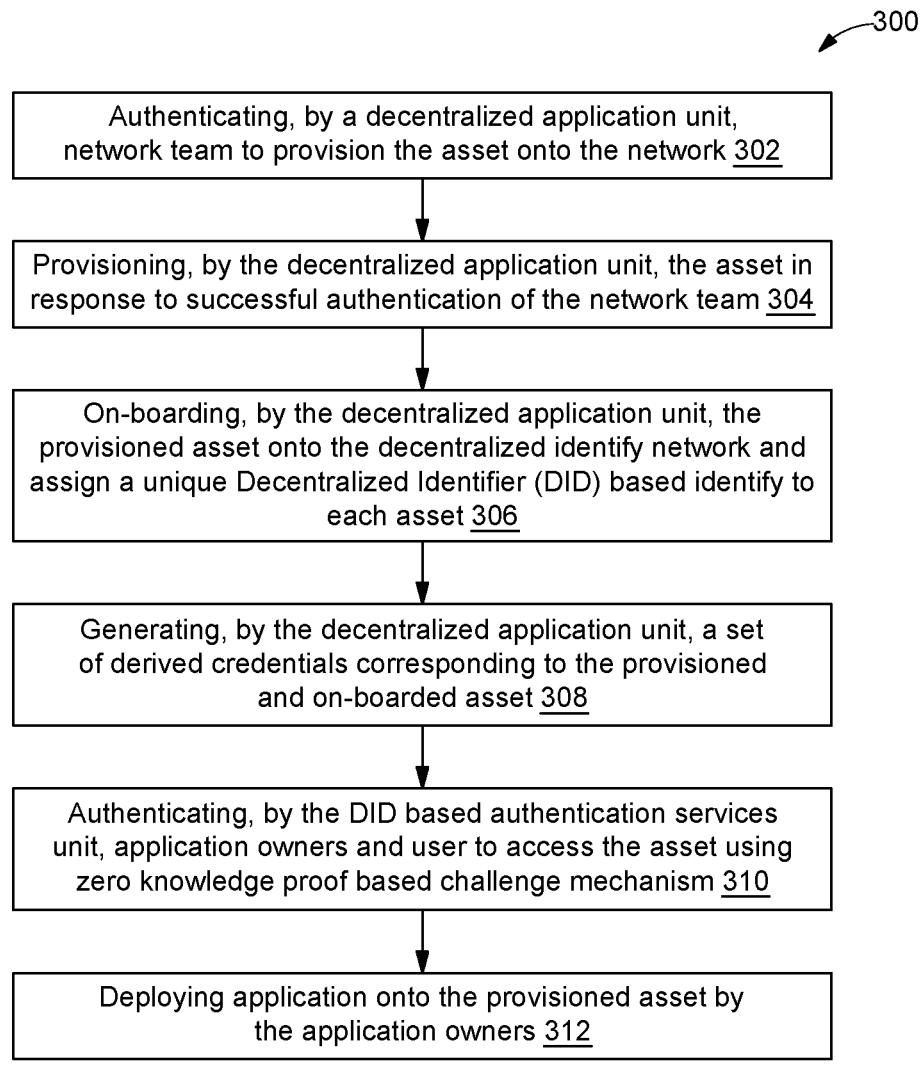
FIG. 3 illustrates a flow diagram of a detailed exemplary method for onboarding an asset onto the network for deploying an application, in accordance with an embodiment of the present disclosure.

Referring now to FIG. 3, an exemplary method 300 for onboarding an asset onto the network for deploying an application is depicted via flowchart, in accordance with the present disclosure. In an embodiment, the method 300 may be implemented by the asset management system 100. The method 300 may include authenticating, by the decentralized application unit 110, network team to provision the asset onto the network, at step 302. The network team may need to authenticate using DID-based authentication services unit 116 to provision a new asset onto the organization network. In an embodiment, the DID-based authentication service unit 116 may be hosted on the decentralized identity network 108 within the organization for managing the identity of employees and assets in the organization. The network team may need to present their proofs that are cryptographically encrypted with the DID-based authentication services unit 116 in order to establish their identity. Further, the network team member may share the proofs to establish his/her identity for enabling authentication to the network provisioning application. As part of the authentication process, audit log entries on the access attempt may be logged into the distributed ledger. In an embodiment, this authentication may be a password-less-based authentication thus enhancing the security and ensuring that non-authorized users may not be able to gain access to the network provisioning application to provide the asset.

Further, the method 300 may include provisioning, by the decentralized application unit 110, the asset in response to successful authentication of the network team, at step 304. The asset on the network may be provisioned to host an application and implement the defined micro-segmentation policy on the provisioned asset. After the network team member authenticates with the network provisioning application, the team member can provision the asset in accordance with the specification shared by the application owners. Further, the asset may be mapped to the defined micro-segmentation policy and the required policies need to be reviewed before they are applied onto the asset. Further, the network team may collaborate with the application owners to confirm if all the pre-requisites for the asset have been provisioned. Further, the network team member may apply the micro-segmentation policies to the asset and update the micro-segmentation data repository 104 with the details on the policies that are applied to the provisioned asset.

Further, the asset may need to be assessed by the security team to confirm the security policies implemented as per the policy definition on the asset. The security team may perform the verification after they authenticate themselves using the DID-based authentication services. Further, the network team member may need to provide access to the asset to the approved list of application owners. The application owners may now be issued with credentials to prove their eligibility to access the specific asset on which their application may be hosted. By using the DID-based authentication services unit 116, the application owners may now be able to access the asset and deploy their application on the asset. The security team after authenticating themselves may assess the security of the asset and application and confirm that the asset may be available for consumption. All the access attempts may be logged onto the distributed ledger. No private information of the employee may be captured on the distributed ledger as it may provide sufficient data to identify who all accessed the asset.

Further, the method 300 may include onboarding, by the decentralized application unit 110, the provisioned asset onto the decentralized identity network 108 and assigning a unique DID-based identity to each asset, at step 306. In an embodiment, to manage the infrastructure in the organization, it may be essential to confirm only the authorized individuals onboard the asset onto the network, apply the security policy, and monitor the assets at regular intervals for compliance. Further, all the assets that need to be onboarded onto the network may generate and manage their identities using decentralized identity IDs. In an embodiment, these decentralized identity IDs may be cryptographically encrypted. While on-boarding the asset onto the decentralized identity network 108, the asset may be issued with a set of credentials in order to prove its identity. In an embodiment, the decentralized application may be configured to issue the credential while onboarding the asset to the specific network environment. The credentials may include the identity of the asset i.e., the DID of the asset, the workloads hosted on the asset. Each workload includes a DID on its own to clearly distinguish the DID from other credentials on the asset. If a change in the micro-segmentation policies and network mapping for the workloads on the asset is detected, the decentralized application unit 110 may initiate the issuance of a new DID for the workload/asset. While issuing the credential, the decentralized application unit 110 may also log the DID for the proof of issuance of the credential onto the distributed ledger. In an embodiment, the credential may include details such as all permitted communication connections that may exist for the asset/workload. The credential may have a listing of the pairwise DID for each valid connection. The agents on the asset may review the credential before permitting connections to proceed. The agents may flag invalid connection attempts and may write such attempts onto the distributed ledger. The authorized users may access the asset/workload.

Further, any new connection request may require a revision to the credentials, and it may pursue a workflow process seeking approval from the authorized stakeholders for the same. The decentralized application unit 110 may log each approval/rejection onto the distributed ledger for audit purposes.

Further, the method 300 may include generating, by the decentralized application unit 110, a set of derived credentials corresponding to the provisioned and on-boarded asset, at step 308. The decentralized application unit 110 may use the micro-segmentation policies implemented on the asset to generate the derived credentials for the assets. All the credentials may be issued to the asset and are stored in the credential data repository 112. If the credential may be generated using information from other credentials, it is known as a derived credential. The derived credentials may be generated for specific business needs and often reflect dynamic information aspects of the asset.

Further, discovery agent 106 verifies the micro-segmentation security policy implemented on the asset against the policy definitions in the micro-segmentation data repository 104. After verification, the discovery agent 106 may share the policy definitions with the decentralized application unit 110 to generate the set of derived credentials. In an embodiment, the decentralized application unit 110 may generate the set of derived credentials based on a pre-defined credential schema definition that describes the type of information that needs to be included in the respective credential. Further, certain credential schema definitions may be generated for specific business purposes such as identifying a user to a specific group definition, and so on. Based on the internal business needs, a variety of such credential schema definitions may be defined. Further, the decentralized application unit 110 may use these credential schema definitions to generate the set of derived credentials. The derived credentials may include details on the micro-segmentation policies implemented on the asset. The credentials may also be issued to the asset. The asset may have an edge device that will enable the asset to interact with the decentralized identity network 108. All the credentials may be stored in the credential data repository 112 and the assets using their edge devices can access their issued credentials from the credential data repository 112.

Further, the method 300 may include authenticating, by the DID-based authentication services unit 116, the application owners and users 120 to access the asset using zero-knowledge proof-based challenge mechanism, at step 310. Once the asset may be provisioned, onboarded onto the decentralized identity network 108, and issued credentials to prove its identity, the application owners, and users 120 can access the asset using the DID-based authentication services unit 116. While attempting to access the asset on-boarded onto the decentralized identity network 108 using the DID-based authentication services unit 116, both the user 120 and the asset may need to present proofs to establish their identity and eligibility to access the asset.

The method 300 may include deploying the application onto the provisioned asset by the application owners, at step 312. The application owners after gaining access to the asset may deploy the application on the provisioned asset and make it available for consumption. All the access attempts to the asset may be logged ono the distributed ledger and can be used for further analysis using the decentralized application unit.

Figure 4:
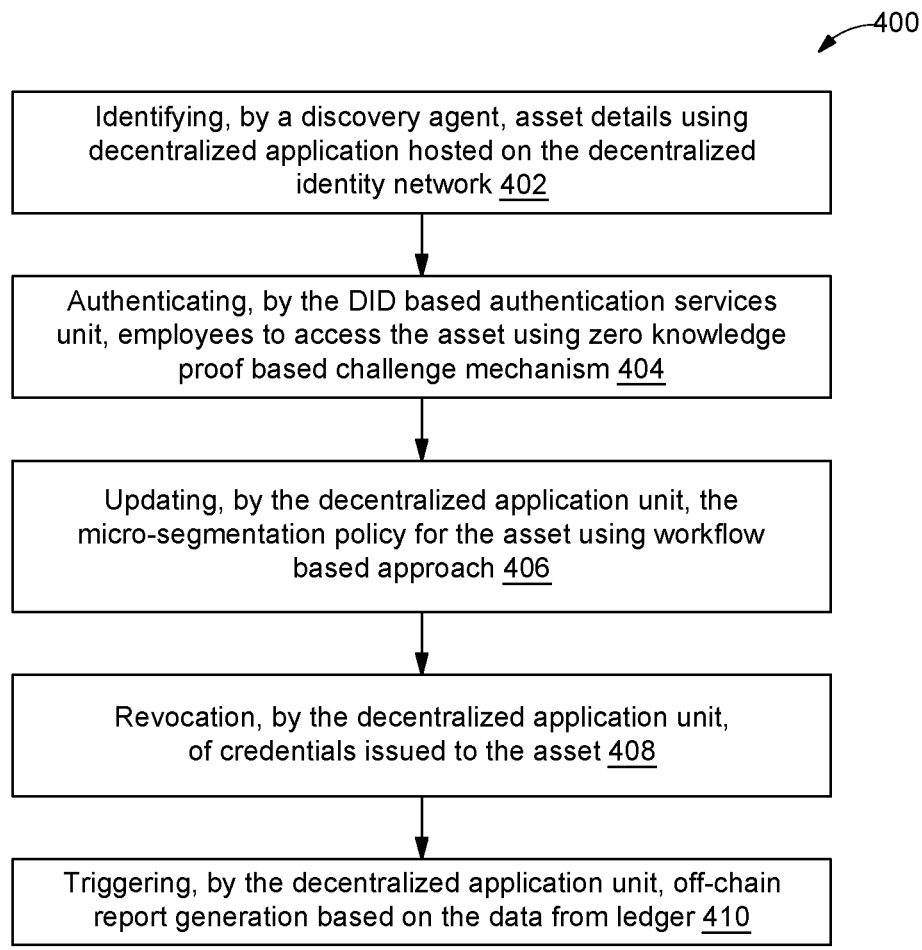
FIG. 4 illustrates a flow diagram of a detailed exemplary method for managing provisioned and on-boarded assets in an organization network, in accordance with an embodiment of the present disclosure.

Referring now to FIG. 4, an exemplary method 400 for managing provisioned and on-boarded assets in an organization network is depicted via flowchart, in accordance with the present disclosure. In an embodiment, the method 400 may be implemented by the asset management system 100. The method 400 may include identifying, by the discovery agent 106, asset details may be identified using a decentralized application hosted on the decentralized identity network 108. In an embodiment, the decentralized application hosted on the decentralized identity network 108 may offer the ability for the network and security team to search for the asset details and history of access logs for the asset. The application offers them to verify information related to the asset on the organization network. The identifying capability may be based on micro-segmented policy and server/application list such as the identifying functionality in the decentralized application may enable the authorized stakeholders to view the assets/applications that they are authorized as owners. Further, the functionality may provide an ability for authorized stakeholders to view any non-compliance issues associated with their assets/applications. The authorized stakeholders may then perform necessary remedial measures to avoid the occurrence of reported issues in the future. The identifying capability may perform against the enterprise wallet and DID registry. It may also list all the servers/applications possessing valid credentials and DID. The network team using this functionality may check for any non-compliance in terms of applications not having valid credentials or DID information in the DID registry.

The method 400 may include authenticating, by the DID-based authentication services unit 116, employees to access the asset using a zero-knowledge proof-based challenge mechanism. Upon provisioning the asset after implementing the micro-segmentation-based security policies, and onboarding the asset onto the decentralized identity network 108, the asset needs to be assessed on regular basis for various purposes ranging from application deployment for new changes, Operating System (OS) upgrades, and security patch application. All the above-stated purposes may require authentication of the respective user to access the asset.

The authentication may be achieved using the DID-based authentication services unit 116. For example, when the security team members need to install new security patches or when the network team members need to perform the planned periodic maintenance of the asset, they need to use the DID-based authentication services unit 116 to establish their identity and obtain access to the asset or application. Whenever the application owners have to access the asset or the application, they need to present proofs with the DID-based authentication services unit 116 then, the DID-based authentication services unit 116 may request the edge devices on the asset to present the proofs issued to the asset. This is a mutual presentation of proofs from both the asset and the user 120 who intends to access the asset.

In an embodiment, the DID-based authentication services unit 116 may employ a series of zero-knowledge proof challenge mechanisms to prove the identity of the user, the asset and confirm that the user is authorized to access the asset. The challenge mechanism may be devised in a manner such that no private information of the user or the asset is shared to establish identity and eligibility to access the asset. The mechanism may be applicable not just to the application owners and users of the application but equally applicable to the security and network team members. In an embodiment, the challenge mechanism may involve a mutual presentation of proofs by the user and asset for authentication to the asset. The DID-based authentication services unit 116 may employ a zero-knowledge proof-based challenge mechanism. On successful presentation of the proofs, the user will now be able to access the asset. Further, all the access attempts may be logged onto the decentralized identity network ledger. Maintaining ledger entries may provide the benefits of data immutability, audit trail while preserving the privacy of the user for analysis purposes.

The method 400 may include updating, by the decentralized application unit 110, the micro-segmentation policy for the asset using a workflow-based approach, at step 406. The decentralized application unit 110 may have the functionality that would enable the network and security team to update the micro-segmentation-based security policies implemented for the asset using the workflow-based approach. Once the network and security team may identify the changes to implement the security policies, they will make the changes and seek approval from the application and asset owners before implementing the same on the asset. The approach may provide transparency to the process of modifying security policies on the asset. The approval and request details may be logged on the decentralized identity networks ledger. While modifying the micro-segmentation policy, the decentralized application unit 110 may trigger a workflow that will seek approval from primary stakeholders of the server or the application that the server hosts. The approval flow may help to prevent any unnecessary changes to the policy, which could impact the communication between the specific application/server with other applications/server. The distributed ledger may register an entry for completion of each stage of this approval workflow. Registering entry may be beneficial for audits and compliance check purposes.

The method 400 may include revoking, by the decentralized application unit 110, credentials issued to the asset, at step 408. The decentralized application unit 110 hosted on the top of the decentralized identity network 108 may trigger the revocation process and any one of the issuer nodes may issue revocation credentials for the respective asset. At times when the application or asset needs to be decommissioned, it may be essential that all credentials issued to it have to be revoked. This may ensure that such asset's credentials are not being misused and avoid any unauthorized access to the same. The decentralized application unit 110 can revoke credentials issued to servers/applications before they expire in specific conditions. One could be retiring the application or server. The other can be making significant changes to the application like changing its technology stack or migrating the server OS to the next version to ensure compliance or achieve support. The changes could have an impact on its communication links. It may be critical to revoke the older credential and issue a new one that aligns with the latest status of the server or application. The assets edge device may enable the asset to interact with the decentralized identity network 108 to access credentials issued to the asset and confirm credentials that are active and not revoked.

The method 400 may include triggering, by the decentralized application unit 110, off-chain report generation based on the data from the ledger, at step 410. The network and security team may now trigger the off-chain reporting process from the decentralized application hosted on the decentralized identity network. The data for the off-chain reports may be based on the data from the ledger. The decentralized application may log the following transactions onto the distributed ledger for audit and compliance check purposes such as creation/revision of micro-segmentation policy, issuance/revocation of the credential, modification to the credential for updating permitted connections between workloads/assets, attempts to invalid connections, and invalid access attempts to an asset/workload.

The security compliance verification and risk evaluation application may be an off-chain application that may be authorized to read the data of the blockchain ledger and create necessary reports. Key functionalities for the application are validating the security policy compliance and creating the report on the same, conducting evaluation of risk assessment in a periodic manner for these defined segments, and using the distributed ledger as a source of truth for the assessments and reports. It may help to offset the effort required by the security analysts and network engineers to identify risks and invalid attempts. The reports may be used by the organization to apply required security measures in place to address the identified risks and non-compliances in the network.

By way of an example, the organization has procured a set of servers for their data center. The network admin needs to authenticate themselves using the DID-based authentication services unit 116. Further, the authentication required to access the organization's asset management application includes a decentralized application unit 110 hosted on the decentralized identity management network. On successful authentication, the network admins need to enter in the asset details in the system, define the micro-segmentation policies for each server and trigger generation of credentials for each server. Further, the server will be onboarded to the decentralized identity network 108 by the network admins using the asset management application. The network admins should authorize the security team to access these new servers and issue-specific credentials to the security team and the assets. The security team will need to authenticate themselves using the DID-based authentication services unit 116 and present their proof with the asset and vice-versa to be authorized to access the server. Post the security inspection, the security team will update the status of their inspection in the asset management application. This will trigger a notification to the network admins to provision the servers to the respective networks. Once the servers have been provisioned, the network admins confirm the connectivity and communication protocols defined in the servers. Then the network admins will authorize the application owner's permission to deploy applications on these servers by issuing the required set of credentials. The application owners will be able to save the issued credentials in their wallet application on their mobile devices. The application owners can then use the same to secure access to the server to deploy their application and make further planned deployments in the future.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
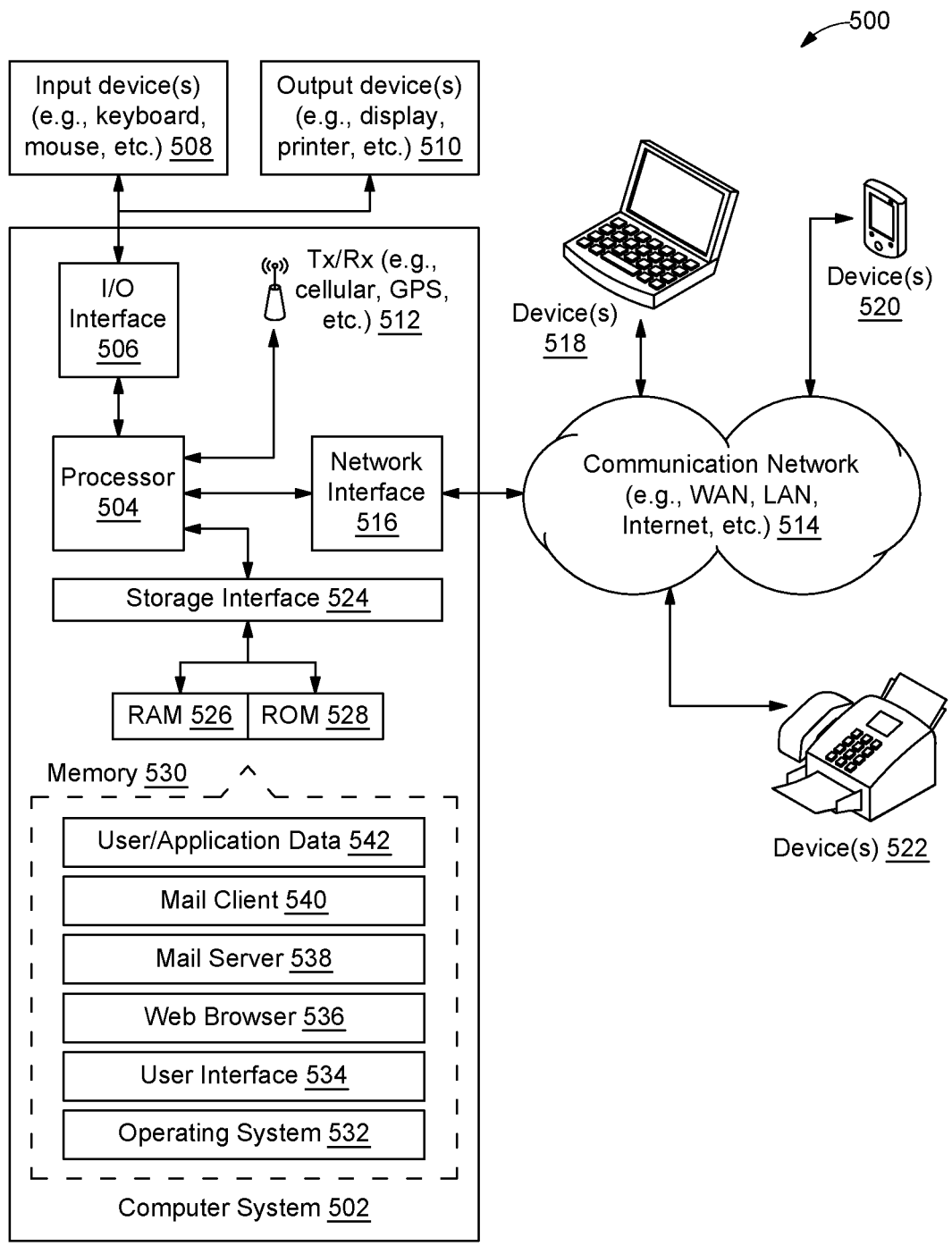
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 502 for implementing embodiments consistent with the present disclosure is illustrated. Variations of computer system 502 may be used for implementing asset management system 100 for building an ensemble model. Computer system 502 may include a central processing unit ("CPU" or "processor") 504. Processor 504 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via I/O interface 506. The I/O interface 506 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 506, the computer system 502 may communicate with one or more I/O devices. For example, the input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with the processor 504. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 504 may be disposed in communication with a communication network 516 via a network interface 514. The network interface 514 may communicate with the communication network 516. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 516 may include, without limitation, a direct interconnection, local area network (LAN), wide area network (WAN), wireless network (e.g., using Wireless Application Protocol), the Internet, etc. Using the network interface 514 and the communication network 516, the computer system 502 may communicate with devices 518, 520, and 522. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 502 may itself embody one or more of these devices.

In some embodiments, the processor 504 may be disposed in communication with one or more memory devices 530 (e.g., RAM 526, ROM 528, etc.) via a storage interface 524. The storage interface may connect to memory devices 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 530 may store a collection of program or database components, including, without limitation, an operating system 532, user interface application 534, web browser 536, mail server 538, mail client 540, user/application data 542 (e.g., any data variables or data records discussed in this disclosure), etc. The operating system 532 may facilitate resource management and operation of the computer system 502. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 534 may facilitate display, execution, interaction, manipulation, or operation of program components through textual or graphical facilities. For example, user interfaces may provide computer interaction interface elements on a display system operatively connected to the computer system 502, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 502 may implement a web browser 536 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 502 may implement a mail server 538 stored program component. The mail server may be an Internet mail server such as MICROSOFT® EXCHANGE®, or the like. The mail server may utilize facilities such as ASP, ActiveX, ANSI C++/C #, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 502 may implement a mail client 540 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 502 may store user/application data 542, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method offers data immutability, security, and transparency beneficial for audit purposes and provides traceability of actions performed with respect to the server/application on-boarded onto the network environment. The method enables password-less authentication for the stakeholders through the presentation of cryptographically encrypted proofs without sharing credentials in plain text format. The use of digitally encrypted cryptographic proofs to initiate communication between servers or applications in a network environment restricts hackers' ability to gain unauthorized access to the systems. Further, the method incorporates a DID-based network for issuing credentials to stakeholders in a decentralized manner for login into their authorized servers/applications, eliminating the need for network administrators to provide the same. Unlike traditional networks, DID-based micro-segmented networks provide additional layers of security to establish communication links between servers/applications within the network environment.

As will be appreciated by those skilled in the art, the workflow in the decentralized application can be customized to permit delegation capability by issuing specific credentials in a decentralized manner, and the details associated with the delegation request will be logged on the distributed ledger for audit purposes. The credentials issued will have a set expiration date. This ensures that credentials are not misappropriated for illegal purposes and at the same time protects the privacy of stakeholders who are authorized to access network applications/servers. The techniques discussed above provide reduced effort for security and network teams to manually verify proper implementation of the micro-segmentation within the network and leverage the off chain reports to identify any non-compliances or deviations.

It is intended that the disclosure and examples be considered as exemplary only, with a true scope and spirit of disclosed embodiments being indicated by the following claims.

We claim:

1. A method for onboarding and managing assets in a decentralized identity network based on micro-segmentation policies, the method comprising:

receiving, by an asset management system, an authorization proof from a member of a team of an enterprise to access an asset in the decentralized identity network, wherein the authorization proof of the member provides a preauthorized access to the asset, and wherein the accessing to the asset is recorded in a distributed ledger;

validating, by the asset management system, the member of the team based on the authorization proof through a set of validator nodes in the decentralized identity network;

upon successfully validating, provisioning, by the asset management system, the asset on the decentralized identity network based on a corresponding set of predefined micro-segmentation policies stored in a micro-segmentation data repository;

onboarding, by the asset management system, the provisioned asset on the decentralized identity network by assigning a unique asset Decentralized Identifier (DID) to the asset through a set of issuer nodes;

generating, by the asset management system, a set of derived credentials of the onboarded asset based on the corresponding set of predefined micro-segmentation policies and the unique asset DID in the decentralized identity network;

validating, by the asset management system, a user access request corresponding to at least one of a user and owners of an application to access the asset using a zero knowledge proof-based challenge mechanism through the set of validator nodes, wherein the user access request comprises the set of derived credentials, and wherein the owners of the application are configured to deploy the application on the asset; and dynamically validating, by the asset management system, an employee access request from an employee of the enterprise and the unique asset DID using the zero knowledge proof-based challenge mechanism through the set of validator nodes, wherein the employee access request comprises a unique employee DID, and wherein the employee access request is stored in the distributed ledger.

2. The method of claim 1, further comprising:

identifying asset details using the application based on the set of predefined micro-segmentation policies corresponding to the asset;

comparing the asset details with the set of predefined micro-segmentation policies; and updating, by a set of authorized stakeholders, the set of predefined micro-segmentation policies for the asset through a workflow-based approach based on the comparing, wherein the set of authorized stake holders comprises at least one of a member from the team, an employee of the enterprise, and the owners of the application, and wherein the workflow-based approach comprises an approval flow from each of the set of authorized stakeholders.

3. The method of claim 1, wherein provisioning the asset on the decentralized identity network comprises:
mapping the asset to the corresponding set of predefined micro-segmentation policies stored in the micro-segmentation data repository;
validating, by the team and the owners of the application, the predefined micro-segmentation policies and security policies of the asset;
applying, by at least one of a plurality of members, the predefined micro-segmentation policies to the asset upon successfully reviewing; and
updating, by the at least one of the plurality of members, the micro-segmentation data repository with the corresponding set of predefined micro-segmentation policies applied to the provisioned asset.

4. The method of claim 3, further comprising:
assigning, by the set of issuer nodes, authentication credentials to the owners of the application to access the asset;
receiving the user access request and the authentication credentials from the owners of the application to access the asset, wherein details corresponding to the user access request are stored in the distributed ledger; and
providing a set of owners of the application access to the asset upon receiving the authentication credentials to deploy an application on the asset.

5. The method of claim 1, wherein onboarding the provisioned asset on the decentralized identity network comprises:
assigning, by the set of issuer nodes, a set of credentials to the asset for onboarding the asset to the decentralized identity network, wherein the set of credentials comprises the unique asset DID, a unique workload DID for each of workloads hosted on the asset, a set of permitted connections for the asset and each of the workloads, a pair wise DID for each of the set of permitted connections, and users authorized to access the asset and one or more of the workloads;
at least one of,
identifying a variation in the micro-segmentation policies and network mapping for at least one of the workloads on the asset; and
receiving a new access request for the asset from the member of the team of the enterprise; and
assigning, by the set of issuer nodes, a new unique workload DID to the at least one of the workloads and a new unique asset DID to the asset, wherein each of the new unique workload DID and the new unique asset DID is stored in the distributed ledger.

6. The method of claim 5, further comprising reviewing, by at least one of the plurality of members, each of the set of credentials corresponding to a plurality of connections for the asset and each of the workloads to determine the set of permitted connections and a set of invalid connection attempts, wherein each of the set of permitted connections and the set of invalid connection attempts is stored in the distributed ledger.

7. The method of claim 1, further comprising revoking, by the set of issuer nodes, each of a set of credentials assigned to the asset, wherein the set of credentials comprises the set of derived credentials.

8. The method of claim 1, further comprising generating an off-chain report through the application based on data corresponding to the asset stored in the distributed ledger.

9. A system for onboarding and managing assets in a decentralized identity network based on micro-segmentation policies, the system comprising:
a processor; and
a memory communicatively coupled to the processor, wherein the memory stored processor instructions, which when executed by the processor, cause the processor to:
receive an authorization proof from a member of a team of an enterprise to access an asset in the decentralized identity network, wherein the authorization proof of the member provides a preauthorized access to the asset, and wherein the accessing to the asset is recorded in a distributed ledger;
validate the member of the team based on the authorization proof through a set of validator nodes in the decentralized identity network;
upon successfully validating, provision the asset on the decentralized identity network based on a corresponding set of predefined micro-segmentation policies stored in a micro-segmentation data repository;
onboard the provisioned asset on the decentralized identity network by assigning a unique asset Decentralized Identifier (DID) to the asset through a set of issuer nodes;
generate a set of derived credentials of the onboarded asset based on the corresponding set of predefined micro-segmentation policies and the unique asset DID in the decentralized identity network;
validate a user access request corresponding to at least one of a user and owners of an application to access the asset using a zero knowledge proof-based challenge mechanism through the set of validator nodes, wherein the user access request comprises the set of derived credentials, and wherein the owners of the application are configured to deploy the application on the asset; and
dynamically validate an employee access request from an employee of the enterprise and the unique asset DID using the zero knowledge proof-based challenge mechanism through the set of validator nodes, wherein the employee access request comprises a unique employee DID, and wherein the employee access request is stored in the distributed ledger.

10. The system of claim 9, wherein the processor instructions, on execution, further cause the processor to:
identify asset details using the application based on the set of predefined micro-segmentation policies corresponding to the asset;
compare the asset details with the set of predefined micro-segmentation policies; and
update, by a set of authorized stakeholders, the set of predefined micro-segmentation policies for the asset through a workflow-based approach based on the comparing, wherein the set of authorized stakeholders comprises at least one of a member from the team, an employee of the enterprise, and the owners of the application, and wherein the workflow-based approach comprises an approval flow from each of the set of authorized stakeholders.

11. The system of claim 9, wherein to provision the asset on the decentralized identity network, the processor instructions, on execution, further cause the processor to:

map the asset to the corresponding set of predefined micro-segmentation policies stored in the micro-segmentation data repository;
validate, by the team and the owners of the application, the predefined micro-segmentation policies and security policies of the asset;
apply, by at least one of a plurality of members, the predefined micro-segmentation policies to the asset upon successfully reviewing; and
update, by the at least one of the plurality of members, the micro-segmentation data repository with the corresponding set of predefined micro-segmentation policies applied to the provisioned asset.

12. The system of claim 11, wherein the processor instructions, on execution, further cause the processor to:
assign, by the set of issuer nodes, authentication credentials to the owners of the application to access the asset;
receive the user access request and the authentication credentials from the owners of the application to access the asset, wherein details corresponding to the user access request are stored in the distributed ledger; and
provide a set of owners of the application access to the asset upon receiving the authentication credentials to deploy an application on the asset.

13. The system of claim 9, wherein to onboard the provisioned asset on the decentralized identity network, the processor instructions, on execution, further cause the processor to:
assign, by the set of issuer nodes, a set of credentials to the asset for onboarding the asset to the decentralized identity network, wherein the set of credentials comprises the unique asset DID, a unique workload DID for each of workloads hosted on the asset, a set of permitted connections for the asset and each of the workloads, a pair wise DID for each of the set of permitted connections, and users authorized to access the asset and one or more of the workloads;
at least one of,
identify a variation in the micro-segmentation policies and network mapping for at least one of the workloads on the asset; and
receive a new access request for the asset from the member of the team of the enterprise; and
assign, by the set of issuer noes, a new unique workload DID to the at least one of the workloads and a new unique asset DID to the asset, wherein each of the new unique workload DID and the new unique asset DID is stored in the distributed ledger.

14. The system of claim 13, wherein the processor instructions, on execution, further cause the processor to review, by at least one of the plurality of members, each of the set of credentials corresponding to a plurality of connections for the asset and each of the workloads to determine the set of permitted connections and a set of invalid connection attempts, wherein each of the set of permitted connections and the set of invalid connection attempts is stored in the distributed ledger.

15. The system of claim 9, wherein the processor instructions, on execution, further cause the processor to revoke, by the set of issuer nodes, each of a set of credentials assigned to the asset, wherein the set of credentials comprises the set of derived credentials.

16. The system of claim 9, wherein the processor instructions, on execution, further cause the processor to generate an off-chain report through the application based on data corresponding to the asset stored in the distributed ledger.

17. A non-transitory computer-readable medium storing computer executable instructions for onboarding and managing assets in a decentralized identity network based on micro-segmentation policies, the computer-executable instructions configured for:
receiving an authorization proof from a member of a team of an enterprise to access an asset in the decentralized identity network, wherein the authorization proof of the member provides a preauthorized access to the asset, and wherein the accessing to the asset is recorded in a distributed ledger;
validating the member of the team based on the authorization proof through a set of validator nodes in the decentralized identity network;
upon successfully validating, provisioning the asset on the decentralized identity network based on a corresponding set of predefined micro-segmentation policies stored in a micro-segmentation data repository;
onboarding the provisioned asset on the decentralized identity network by assigning a unique asset Decentralized Identifier (DID) to the asset through a set of issuer nodes;
generating a set of derived credentials of the onboarded asset based on the corresponding set of predefined micro-segmentation policies and the unique asset DID in the decentralized identity network;
validating a user access request corresponding to at least one of a user and owners of an application to access the asset using a zero knowledge proof-based challenge mechanism through the set of validator nodes, wherein the user access request comprises the set of derived credentials, and wherein the owners of the application are configured to deploy the application on the asset; and
dynamically validating an employee access request from an employee of the enterprise and the unique asset DID using the zero knowledge proof-based challenge mechanism through the set of validator nodes, wherein the employee access request comprises a unique employee DID, and wherein the employee access request is stored in the distributed ledger.

18. The non-transitory computer-readable medium of claim 17, wherein computer-executable instructions are further configured for:
identifying asset details using the application based on the set of predefined micro-segmentation policies corresponding to the asset;
comparing the asset details with the set of predefined micro-segmentation policies; and
updating, by a set of authorized stakeholders, the set of predefined micro-segmentation policies for the asset through a workflow-based approach based on the comparing, wherein the set of authorized stake holders comprises at least one of a member from the team, an employee of the enterprise, and the owners of the application, and wherein the workflow-based approach comprises an approval flow from each of the set of authorized stakeholders.

19. The non-transitory computer-readable medium of claim 17, wherein for provisioning the asset on the decentralized identity network, the computer-executable instructions are further configured for:
mapping the asset to the corresponding set of predefined micro-segmentation policies stored in the micro-segmentation data repository;

validating, by the team and the owners of the application, the predefined micro-segmentation policies and security policies of the asset;

applying, by at least one of a plurality of members, the predefined micro-segmentation policies to the asset upon successfully reviewing; and updating, by the at least one of the plurality of members, the micro-segmentation data repository with the corresponding set of predefined micro-segmentation policies applied to the provisioned asset.

20. The non-transitory computer-readable medium of claim 17, wherein for onboarding the provisioned asset on the decentralized identity network, the computer-executable instructions are further configured for:

assigning, by the set of issuer nodes, a set of credentials to the asset for onboarding the asset to the decentralized identity network, wherein the set of credentials comprises the unique asset DID, a unique workload DID for each of workloads hosted on the asset, a set of permitted connections for the asset and each of the workloads, a pair wise DID for each of the set of permitted connections, and users authorized to access the asset and one or more of the workloads;

at least one of, identifying a variation in the micro-segmentation policies and network mapping for at least one of the workloads on the asset; and receiving a new access request for the asset from the member of the team of the enterprise; and assigning, by the set of issuer nodes, a new unique workload DID to the at least one of the workloads and a new unique asset DID to the asset, wherein each of the new unique workload DID and the new unique asset DID is stored in the distributed ledger.

* * * * *